US010942820B2

(12) United States Patent
Reddy A V et al.

(10) Patent No.: US 10,942,820 B2
(45) Date of Patent: Mar. 9, 2021

(54) STREAM LEVEL UNINTERRUPTED RESTORE OPERATION USING AN INTERRUPT SERVICE ROUTINE APPROACH (71) Applicant: EMC IP Holding Company LLC, Hopkinton, MA (US)

(72) Inventors: Mahesh Reddy A V, Bangalore (IN); Battal Chetan, Bangalore (IN); Mahantesh Ambaljeri, Bangalore (IN); Swaroop Shankar D H, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 74 days.

(21) Appl. No.: 16/454,666

(22) Filed: Jun. 27, 2019

(65) Prior Publication Data
US 2020/0409800 A1 Dec. 31, 2020

(51) Int. Cl.
*G06F 11/14* (2006.01)
*G06F 13/24* (2006.01)
*G06F 9/48* (2006.01)

(52) U.S. Cl.
CPC ........ *G06F 11/1466* (2013.01); *G06F 9/4812* (2013.01); *G06F 11/1448* (2013.01); *G06F 11/1469* (2013.01); *G06F 13/24* (2013.01)

(58) Field of Classification Search
CPC .. G06F 11/1466; G06F 11/1448; G06F 13/24; G06F 11/1469; G06F 9/4812
See application file for complete search history.

(56) References Cited

U.S. PATENT DOCUMENTS

| | | | | |
|---|---|---|---|---|
| 5,875,341 A | * | 2/1999 | Blank | G06F 9/4812 710/260 |
| 7,076,576 B2 | * | 7/2006 | Nishimura | G06F 15/17375 370/401 |
| 7,315,961 B2 | * | 1/2008 | Ramirez | G06F 11/0721 714/15 |
| 8,204,863 B2 | * | 6/2012 | Sawdon | G06F 11/1469 707/679 |
| 10,078,604 B1 | * | 9/2018 | Cristobal | G06F 9/4825 |
| 2007/0028240 A1 | * | 2/2007 | Hayakawa | G06F 11/3636 718/100 |

(Continued)

*Primary Examiner* — Tasnima Matin
(74) *Attorney, Agent, or Firm* — Womble Bond Dickinson (US) LLP (57) ABSTRACT

Embodiments are described for performing an uninterrupted restore in a storage system in view of one or more abort events. A restore agent receives writes one or more data blocks to a conditional construction container. A parent interrupt service routine (ISR) polls for abort events. In response to an abort event, an intermediate interrupt is generated that spawns a child processes for each process of the restore. The intermediate ISR logs each child ISR, the process it is responsible for, and the intermediate interrupt, for later restoration of the restore state. After a recovery of the above event, then each child ISR can be called to restore its state. After restoring the state, the restore agent resumes the restore from where the abort event was detected. The child ISRs are re-entrant. If another abort event is detected, the restore state can again be saved and later resumed from that state.

21 Claims, 8 Drawing Sheets

(56) References Cited

U.S. PATENT DOCUMENTS

| | | | |
|---|---|---|---|
| 2008/0276222 A1* | 11/2008 | Yamagami | G06F 11/1441 717/124 |
| 2012/0084477 A1* | 4/2012 | Arndt | G06F 9/3004 710/266 |
| 2013/0144939 A1* | 6/2013 | Prahlad | H04L 67/10 709/203 |
| 2019/0354464 A1* | 11/2019 | Peck | G06F 11/3656 |

* cited by examiner

STREAM LEVEL UNINTERRUPTED RESTORE OPERATION USING AN INTERRUPT SERVICE ROUTINE APPROACH

TECHNICAL FIELD

This disclosure relates to the field of restoring previously backed up data of a client or host computer. More specifically, the disclosure relates to performing a more efficient restore of application data.

BACKGROUND

Data protection services include backing up data from, and restoring data to, a host or client device (collectively and individually, "client") and a backup/restore server. Data sets to be backed up or restored (collectively and individually "data transfer") may be many hundreds of terabytes, or even petabytes, of data that pass over a network between the client and server. Large scale data transfers take a long time, such that one or more events may intervene to cause a failure of the data transfer. Unexpected events can include a power outage, a network failure, failure of a read or write of one or more storage devices, and facility outages, such as disasters (earthquake, fire, etc.).

In the prior art, once a data transfer is started and is then interrupted by an abort event, the data transfer must be restarted again from the beginning, after recovery from the unexpected abort event. It is also possible, or likely, that another intervening abort event may occur after the data transfer has been restarted from the beginning, again causing the data transfer to need to be restarted from the beginning. For example, during certain seasons, weather conditions may cause more than one power outage with an intervening recovery.

It is common for large enterprises to have a backup/restore service to perform these large data transfers, to protect and restore the enterprise production data, for exactly the same reasons that cause the data transfer problem: an unexpected abort event may occur at the enterprise data facility, causing a corruption of production data and thus requiring a restore of data from a backup of the production data. The enterprise may typically have a "service level agreement" (SLA) with the backup/restore service that guarantees that a data transfer will be performed within a window of time specified in the SLA. A data transfer, interrupted by one or more abort events, may cause the backup/restore service to fail to meet the window of time specified in the SLA.

In addition, if the data transfer is a restore operation, and the abort event occurs during the restore process, interruption of the restore process by an unexpected abort event can cause corruption of production data when the restore operation fails due to the unexpected abort event.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

In a first embodiment, a method of performing uninterrupted restores in view of one or more unexpected abort events includes, in response to a restore agent receiving one or more data packets to be restored, invoking a parent interrupted service routine (ISR) that polls for an unexpected abort event. The method further includes writing the received data packets to a conditional construction container communicatively coupled to a target storage. The method can also include masking the parent ISR and stopping the restore agent writes to the conditional construction container. Saving the restore state can include generating a re-entrant child ISR for each restore process in the plurality of backup processes, and calling each child ISR to hold the current state of the restore process. Saving the restore state can also include calling an intermediate ISR. For each child ISR, the intermediate child ISR logs the current state of the restore process in the plurality of restore processes, in association with the intermediate child ISR. In response to receiving the unexpected abort event, a state of a plurality of restore processes is saved. After restoring the saved state at a future time, the restore is completed. Restoring the saved restore state can include querying the intermediate child ISR to fetch details of the current state of the plurality of restore processes and calling each child ISR to enforce the fetched current state of a restore process in the plurality of restore processes. When each child ISR completes restoring the saved backup state of its associated restore process, the restore agent can be notified that the pre-abort state of the restore processes has been restored and the restore can resume receiving data packets and writing data packets to the conditional construction container. If a second unexpected abort event is received, each re-entrant child ISR can be called a second time to save state for each restore process of a second plurality of restore processes.

In an embodiment, a non-transitory computer readable medium can store executable instructions that, when executed by a processing system having at least one hardware processor, can perform any of the functionality described above.

In yet another embodiment, a processing system having at least one hardware processor is coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

Figure 1:
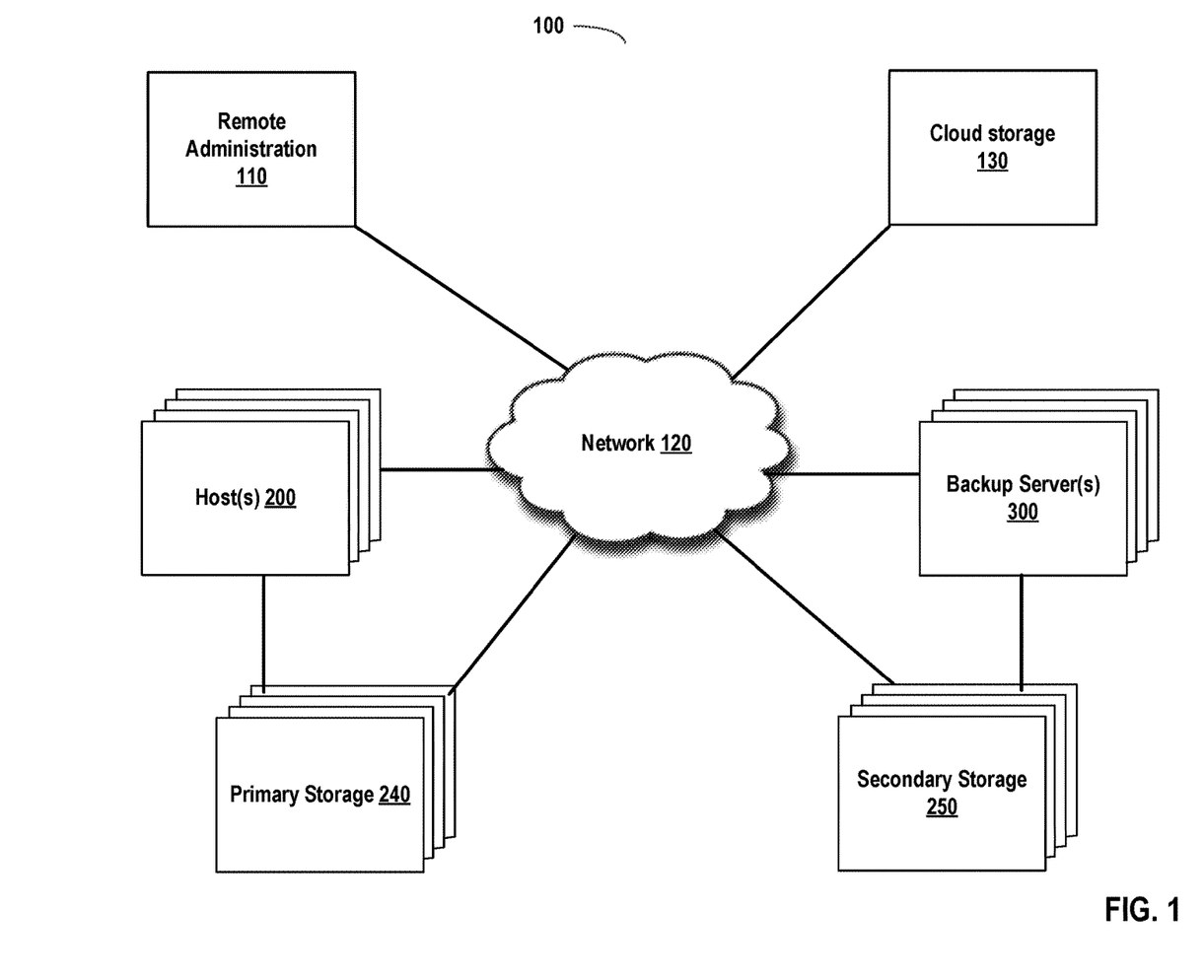
FIG. 1 illustrates, in block diagram form, an overview of a computing infrastructure that can perform uninterrupted restores in view of one or more unexpected abort events in a storage system, in accordance with some embodiments.

FIG. 1 illustrates, in block diagram form, an overview of a computing infrastructure 100 that can perform uninterrupted backups and restores ("data transfers") in view of one or more unexpected abort events in a storage system, in accordance with some embodiments. In this disclosure, an uninterrupted data transfer comprises a data transfer that may be aborted due to an unexpected abort event, and can be resumed from the point of abort, after recovery from the abort event, without restarting the data transfer from the beginning. For example, if a data transfer (either backup or restore) of a client data set is 10 terabytes, and 3 terabytes have been backed up when an unexpected abort event is received, then after the cause of the abort event is remedied (e.g. network back up, power back on, failed disk replaced, etc.) then the data transfer can complete the remaining 7 terabytes of data transfer without having to restart the data transfer from the beginning.

A computing infrastructure 100 that can perform uninterrupted restores in view of one or more abort events. Abort events can include a power outage, a facility disaster (earthquake, tornado, flood, fire, e.g.) or a failure of equipment such as a communication network failure, a read or write error of a storage device, failed processor, and the like.

Computing infrastructure 100 can include remote administration 110, one or more hosts or clients 200, a cloud storage service 130, one or more primary storages 240 that may hold client production data, one or more backup servers 300, and one or more secondary storages 250, all interconnected by network 120.

Hosts 200, storage appliance(s) 240 and 250, backup servers 300, and remote administration module 110 can also be coupled to a one or more cloud storage services 130 which can act as a secondary storage 250. Host(s) 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be a primary storage system (e.g., local data center) that provides storage to other local clients, which may periodically back up the content stored therein to a backup storage system (e.g., a disaster recovery site or system), such as backup server 300 or secondary storage system 250. Network 120 may be any type of networks such as a local area network (LAN), a wide area network (WAN) such as the Internet, a fiber network, a storage network, or a combination thereof, wired or wireless. Components of an example host device 200 can be as described with reference to FIG. 2 and FIG. 7, below.

Host 200 can backup or restore one or more application data sets of a virtual machine (VM) on the host 200 to, or from, the backup server 300. A virtual machine on host 200 can include a restore application agent, a restore agent, and a hypervisor, all of which can communicate with a restore application on backup server 300, to facilitate efficient restores of application data on one or more VM's. Backup server 300 can, in turn, opt to store all or a portion of the backed up application data sets to cloud storage 130 or to secondary storage 250. Applications that generate client production data can be e.g., SAP, DB2, SQL Server, Exchange, Sharepoint®, Microsoft® Exchange®, or other application. An application can have its own restore component that facilitates restore of the application data from secondary storage to primary storage 240, backup server 300, or a cloud storage 130. The restore component can have a restore application programming interface (API) that can be called to invoke a restore of the application data set and/or to return metrics about a restore of the application data set.

A primary storage 240 or a secondary storage 250 can comprise a large number of disks, such as EMC® VMAX 400K with up to 5,760 hard drives. In an embodiment, one or more primary storages 240 can form a part of a host 200. In an embodiment, a virtual disk can be a raw virtual disk mapped to a one or more portions of storage. A portion of storage can comprise one or more logical unit numbers (LUNs) of a single physical disk or one or more physical disks in a primary storage 240. In an embodiment, a raw disk can be configured to use virtual mapping to one or portions of storage, such that the portions of storage can be snapshot before a restore. In an embodiment, a raw virtual disk can be physically mapped to one or more portions of storage.

A primary storage 240 can include a conditional construction container (CCC) 245. CCC 245 can be one or more areas of storage, such as one or more logical unit numbers (LUNs), one or more containers of storage, one or more disks, or other preallocated area of storage. CCC 245 can act as a staging area for disk snapshots for backing up data, or for storing data to be restored from a previous backup of client production data. In a restore example, CCC 245 can be used to receive data blocks in a restore operation and to prepare the received blocks in a manner that enables a quick cut over from the CCC 245 copy of the restored data blocks to overwriting existing production data. In addition, CCC 245 can hold all data to be restored in a restore operation, so that no data received by CCC 245 in a restore operation is applied to production data until the CCC 245 receives all data to be restored and is ready to cut over the CCC 245 to overwrite the production data to be restored.

A restore of a client application data set from a secondary storage 240 to a primary storage 250, or to a host 20 storage, can be initiated by a user of the client, or a remote administrator 110. In an embodiment, the restore can be initiated by a backup/restore application on backup server 300, or by a backup/restore proxy on another machine. For example, a backup/restore proxy can be implemented on as a virtual machine on a host machine. Backup server 300 can initiate a backup or restore of a client application data set on host 200 in accordance with one or more backup policies each associated with a client and an application on the client/host 200. For example, a policy for a virtual machine on host 200 can be that a full backup of a Microsoft® Sharepoint® database is performed every Friday evening.

Figure 2:
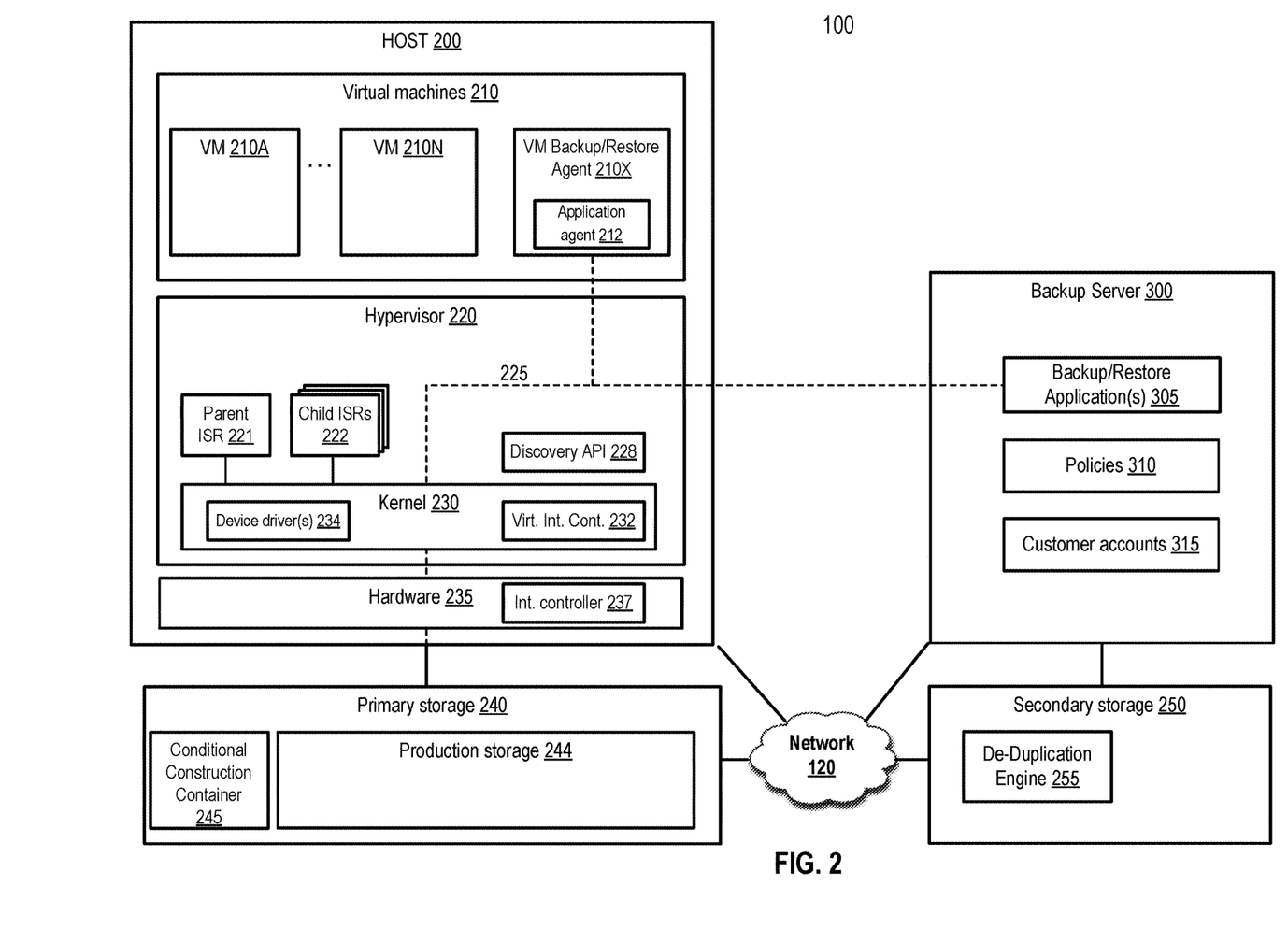
FIG. 2 illustrates, in block diagram form, a detailed view of a computing infrastructure that can perform uninterrupted restores in view of one or more unexpected abort events in a storage system, in accordance with some embodiments.

FIG. 2 illustrates, in block diagram form, a detailed view of a computing infrastructure that can perform uninterrupted restore s in view of one or more unexpected abort events in a storage system, in accordance with some embodiments.

A virtual infrastructure 100 can include one or more host computing systems 200 ("host"), a backup server 300, a primary storage 240, and a secondary storage 250. In an embodiment, these components can be communicatively interconnected via network 120. Host 200 can have a plurality of virtual machines 210, including VM 210A through VM210N, where N can be a positive integer. In an embodiment, VMs 210 can include a backup/restore agent or proxy ("agent") 210X implemented as a VM. VM backup/restore agent 210X can further include an application agent 212 that facilitates backup and restore of production data generated by one or more particular applications.

Network 120 can be any type of network such as a local area network (LAN), a wide area network (WAN) such as Internet, a corporate intranet, a metropolitan area network (MAN), a storage area network (SAN), a bus, or a combination thereof, wired and/or wireless networks.

A client having an application with an application data set to be backed up or restored can be host 200 or a virtual machine 210 on the host 200 (interchangeably, "client"). A host 200 can include physical hardware 235, a virtual machine manager or "hypervisor" 220, one or more virtual machines (VM) 210, or one or more virtual proxy nodes (VP) 210X.

Physical hardware 235 can include a physical basic input-output system (BIOS), one or more physical disks or storage devices, one or more network interface cards (NIC), memory, and one or more hardware processors or CPUs, interrupt controller(s) 237, and the like. Host 200 can be implemented in accordance with the computing system described with reference to FIG. 7, below.

Host 200 can include hypervisor 220 that provides a virtualization abstraction layer to support one or more virtual machines (VMs) 210 on host 200. Host 200 can further include virtual hardware, such as virtual interrupt controller 232, that can correspond to physical hardware 235, such as a virtual BIOS, one or more virtual storage devices (VDISK), one or more virtual network interface cards (VNIC), virtual memory, and one or more virtual processors or CPUs.

Hypervisor 220 can include a communication channel 225 between VM backup/restore agent 210X, application agent 212, kernel 230, hardware 235, primary storage 240, and a backup/restore application 304 on backup server 300. Communication channel 225 can be implemented using function calls to/from a framework or application programming interface, interprocess communication, communication by interrupts and mailboxes, and the like. Kernel 230 can perform operating system functions that support virtualization in hypervisor 220, perform input/output using the one or more device drivers 234, and other operating system services. One or device drivers 234 in kernel 230 can be used to interface the hypervisor 220 to connected hardware 235.

VM backup/restore agent 210X can include an application agent 212. Applicant agent 212. VM backup/restore agent 210X can receive a backup/restore policy 310 (collectively and individually, "backup policy") from backup server 300 via backup/restore application 305. The backup policy 310 can indicate a frequency of backup, type of backup, the application data whose data is to be backed up, or restored, and other backup or restore parameters. Application agent 212 can configure the backup/restore functionality using the backup policy 310. For example, backup policy 310 can state, "for this client, for application Microsoft® Exchange®, perform a full backup once per week, perform an incremental backup every 6 hours, and backup the application data to cloud storage."

In response to a request, e.g. from backup/restore application 305, to perform a backup in accordance with a backup policy 310, application agent 212 can quiesce the state of the application, e.g. Microsoft® Exchange®, and cause a volume snapshot service (VSS) snapshot to be taken of Microsoft® Exchange® application state. The VSS snapshot records the application data state even while the application is in use. A VSS snapshot is a read-only point-in-time copy of a volume. VSS snapshots allow the creation of consistent backups of a volume, ensuring that the contents do not change and are not locked while the backup is being made.

The VSS snapshot can be a part of quiescing the application state. However, the application state can only be quiesced for a limited period of time which is much shorter than the time it takes to move the application data to secondary storage 250. Application agent 212 can also cause VM backup/restore proxy 210X to take snapshot 245 of the application data on the production storage 244. Snapshot 245 is stored on the same production disks 244 that store the application data for which the snapshot 245 was taken. After the virtual snapshot is generated, and application agent 212 has been notified that the virtual snapshot has been generated, then application agent 212 can resume the application.

VM 250 can further include an application discovery application programming interface (API) 228 that can discover one or more applications that run on the VM 210. Each application can include a backup/restore API that interfaces to the application data generated by the application. Backup/restore API can also access meta data about application data that has been backed up, or is ready to be backed up. Meta data can indicate a current size of the application data set, a percentage of the application data set that has changed since a last backup, a number of inputs and outputs (I/O's) performed on the data set since the last backup, and other information about one or more backups of the application data set.

In an embodiment, host 200 can further include a storage manager or storage controller (not shown) configured to manage storage resources of host 200, such as, for example, storage space and processing resources (e.g., processor, memory, network resources). The storage manager or controller may be accessed by an remote administrator 110 (as shown in FIG. 1) remotely via a management or configuration interface (not shown). The remote administrator 110 can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines 210 (e.g., virtual storage systems) managed by a hypervisor 220. Each of the virtual machines can be provisioned to provide a particular type of storage services (e.g., file-based, block-based, object-based, or HDFS) to a client based on a storage policy or service level agreement associated with that particular client as part of software-defined storage services.

Primary storage 240 can include any type of server or cluster of servers. For example, primary storage 240 may be a storage server used for any of various different purposes, such as to provide multiple users with access to shared data and/or to backup mission critical data. Primary storage 240 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Primary storage 240 may have a distributed architecture, or all of its components may be integrated into a single unit. Primary storage 240 may be implemented as part of a primary storage available from EMC® Corporation of Hopkinton, Mass., such as the EMC® VMAX family of storage appliances.

Primary storage 240 can include and plurality of storage units (not shown) which may interconnected inside the primary storage, or as a backplane, via a bus and/or a network. Storage units can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units may also be combinations of such devices. In the case of disk storage media, the storage units may be organized into one or more volumes of Redundant Array of Inexpensive Disks (RAID).

Primary storage 240 can further includes raw disk mapping files that map a virtual disk of a virtual machine 210 to one or more portions of storage on the primary storage 240. A portion of a primary storage 240 can be a logical unit number (LUN). Raw disk mapping to one or more portions of storage can be physical mapping or a virtual mapping. Primary storage 240 can be coupled to backup server 300 and/or secondary storage 250 via network 120.

Secondary storage 250 can be coupled to backup server 300 either as direct attached storage (DAS) or as network attached storage (NAS) via network 120. Secondary storage 250 may include any type of server or cluster of servers. For example, secondary storage 250 may be a storage server used for any of various different purposes, such as to provide multiple users with access to shared data and/or to backup mission critical data. Secondary storage 250 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Secondary storage 250 may have a distributed architecture, or all of its components may be integrated into a single unit. Secondary storage 250 may be implemented as part of an archive and/or backup storage system such as a de-duplication storage system available from EMC® Corporation of Hopkinton, Mass.

Secondary storage 250 can include, but is not limited to, deduplication storage engine 255, and one or more storage units (not shown) communicatively coupled to each other. Storage units may be implemented locally (e.g., single node operating environment) or remotely (e.g., multi-node operating environment) via a bus and/or a network. Storage units can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units may also be combinations of such devices. In the case of disk storage media, the storage units may be organized into one or more volumes of Redundant Array of Inexpensive Disks (RAID). Note that in one embodiment, backup server 300 and secondary storage 250 are integrated into one single system.

Optional deduplication storage engine 255 is configured to segment data files into multiple segments according to a variety of segmentation policies or rules. Deduplication storage engine 255 only stores a segment in a storage unit if the segment has not been previously stored in the storage unit. In the event that a segment has been previously stored, metadata about the segment is stored enabling the reconstruction of a file using the previously stored segment. As a result, segments of data files are stored in a deduplicated manner, either within each of storage units or across at least some of storage units. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

Backup server 300 can be a computing system as described with reference to FIG. 7, below. Backup server 300 can comprise one or more computing systems. Backup server 300 can include, but is not limited to, a backup/restore application 305, and one or more policies 310, and one or more customer accounts 315. Customer accounts 315 can store service level agreement (SLA) data for one or more customers. Backup policies 310 can contain an SLA for particular users or groups of users of the customer that specify how often certain application data is to be backed up, the type of the backup to perform (incremental or full), and the tier of storage where the backup data is to be stored. A restore operation may need to access backup policies 310 to determine a type (incremental or full) of a backup of a data set to be restored. A tier of storage can be, e.g., tier 1 storage having fast access, tier 2 storage, e.g. cloud storage, which may be deduplicated and travel across a network for access, tier 3, e.g. long term storage which may comprise tapes, read-only disks, or other slower storage devices.

A backup server 300 operating as a storage system may include or represent any type of servers or a cluster of one or more servers (e.g., cloud servers 130). For example, storage system 300 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Backup/restore application 305 can invoke logic in application agent 212 to discover the applications that may be installed and/or running on VM 210. Applicant agent can call one or more application programming interfaces on hypervisor 220 to determine changes to application data since a last backup.

Backup server 300 can coordinate with primary storage 240, secondary storage 250, and host computing system 200 to run various backup and/or restore operations. Backup/restore application 305 may perform both backup and restore functions, invoke discovery APIs within hypervisor 220, and within VMs 210. Backup/restore application 305 can read and write backup accounts 315 and backup policies 310 on backup server 300, or across multiple storage devices accessible to backup server 300.

Customer accounts 315 can store identifying information about a particular client, such as a textual name, a network address, a universally unique client identifier (UUID), and biographic information about the individual and/or company that owns the client. Customer accounts 315 can include login information to backup server 300 for users of virtual machines 250 and administrators who may access backup server 300 via remote administration module 110. Customer accounts 315 can be aggregated by company, by region, or other metric, such that backup policies 335 can be generated for one or more customer accounts 315 by company, by region, or other metric, such as by data center or business operating group.

Policies database 310 can include, for each application on a client, a backup policy including a backup policy type (by application, by I/O change rate, by user rule) and a protection level for the application data. A protection level can indicate a frequency that application data should be backed up. A protection level can have a textual name to indicate a frequency or range of frequencies for backup. For example, platinum protection level may indicate a backup every 15 minutes and bronze protection level may indicate a backup once each data for a particular application on a client/VM 210. Backup policies 310 can specify particular applications whose data gets backed up from a virtual machine 210, retention policy for the backed up data, whether the backups are incremental, full, image, or an alternating or interleaved combination of these. Backup policies 310 can further define whether data is deduplicated before storage, how quickly the storage can be retrieved for access by a virtual machine, and other policy parameters.

FIGS. 3A through 3D illustrates, in block diagram form, states of a storage system that can perform uninterrupted restores in view of one or more unexpected abort events in a storage system, in accordance with some embodiments.

Figure 3A:
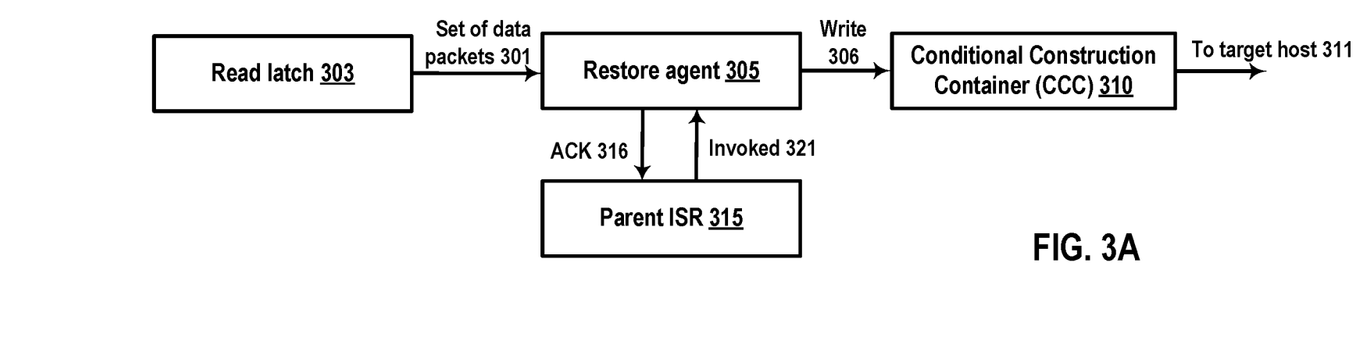
FIGS. 3A through 3D illustrates, in block diagram form, states of a backup/restore system that can perform uninterrupted restores in view of one or more unexpected abort events in a storage system, in accordance with some embodiments.

FIG. 3A illustrates a first portion of a process for restoring data from secondary storage 250 to a host device 200 to target storage, such as primary storage 240. The restore agent 305 can be backup/restore agent VM 210X as shown in FIG. 2. Restore agent 305 receives a first set of data packets or blocks 301 that are to be restored. Concurrently with receiving the first set of data packets 301, restore agent 305 invokes 321 parent interrupt service routine (ISR) 315. Parent ISR 315 sends an acknowledgement (ACK) 316 to restore agent 305, confirming that parent ISR 315 has been invoked. Parent ISR 315 begins polling for occurrence of an unexpected abort event.

Restore agent 305 writes 306 the first set of data packets to conditional construction container (CCC) 310. CCC 310 can write the first set of data packets to target device 311. Target device 311 can be, e.g. secondary storage 250.

Figure 3B:
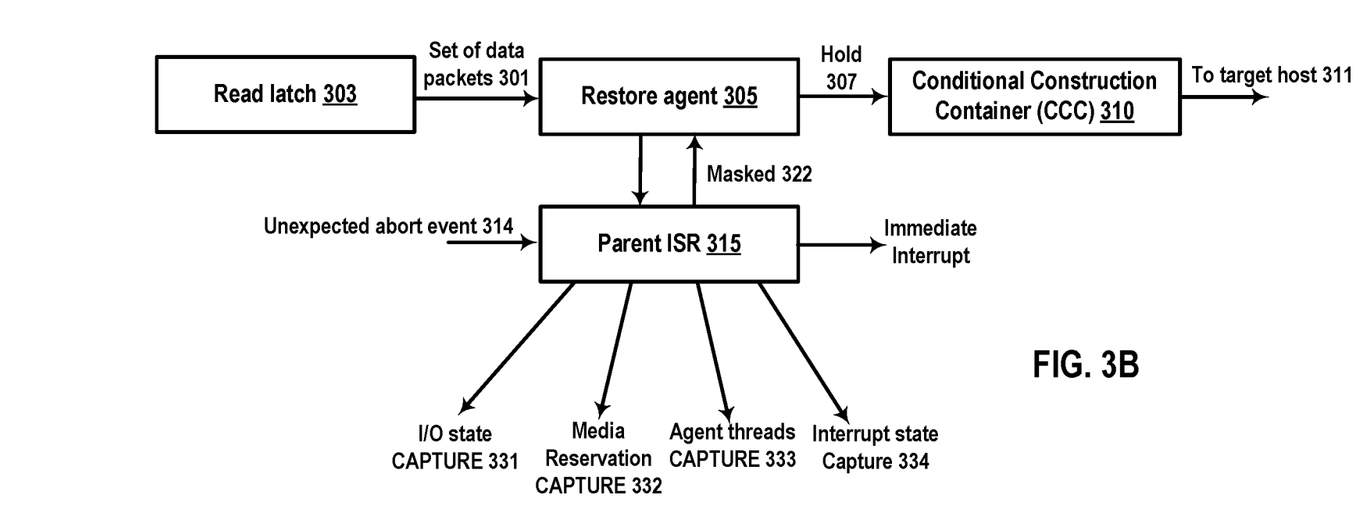

Referring now to FIG. 3B, parent ISR 315 can receive an unexpected abort event 314, in response to polling for such an event. The parent ISR 315 can go into a masked mode 317. Restore agent 305 can stop 307 sending data packets to CCC 310, which in turn stops sending data packets to target device 311. Parent ISR 315 can generate intermediate child interrupt. The intermediate child interrupt can spawn multiple individual child ISRs to manage saving the state of various aspects of the restore process. In an embodiment, each child ISR is re-entrant. The multiple individual child ISRs (e.g. 331-334) can hold each and every state of the I/O states, agent thread states, media reservation daemons, and intermediate interrupts states to ensure an interrupt-state pair for each child ISR that can later be used by the parent ISR to enforce the state held by the child ISR.

For example, each child ISR 331 can manage saving an I/O state of the restore process. Input/output (I/O) states of I/O requests indicate either a requestor or service provider to perform a certain task. For example, I/O requests on a Microsoft® Exchange® server could be as follows: (a) open transaction log, (b) flushing existing transaction, (c) clear caches, (d) request resource, and (e) route the output. In this disclosure, each I/O state indicates a particular request's status/request as it is. From the backup/restore perspective, these could be write/read request, media wait, request, media reserve request, data stream status, etc.

Each child ISR 332 can manage saving the state of a media reservation. If there are multiple media reservations, in an embodiment, a child ISR can be generated to save the state of each media reservation. In an embodiment, a child ISR is generated for each media reservation requested for the restore. Media reservation refers to the reservation status of the storage medium as per the system administrator. A child ISR paired with a media reservation would monitor the media daemon's status to ensure the compliance of the media reservation/quota for that particular data byte even after a previously interrupted backup/restore. For example the data byte with equivalent number OxBDOFF is to be routed to a cloud device, this particular child ISR 332 would make sure that it is going to the cloud device by indicating the right location to the data byte during the uninterrupted restore session.

Each child ISR 333 manages saving the state of a restore agent 305 thread or a daemon. These are the threads that originate from the restore agent 305 to provide the server. For example, in a networker product, there are several daemons that run to achieve the service, e.g. "nsrnmmsv" to trigger a save operation, "nsrnmmrc" to trigger a read operation, "nsrjobd" to track and monitor the restore job, "nsrindexd" to index each data set against its backup time. Example threads include, e.g., when nsrnmmsv is triggered, secondary threads with similar names but different identifiers would be triggered on different nodes with a cluster. In an embodiment, there could be a media reservation thread that would be triggered and monitored by nsrmmd daemon.

Each child ISR 334 can save the state of an interrupt service call used in the performing a restore process.

Figure 3C:
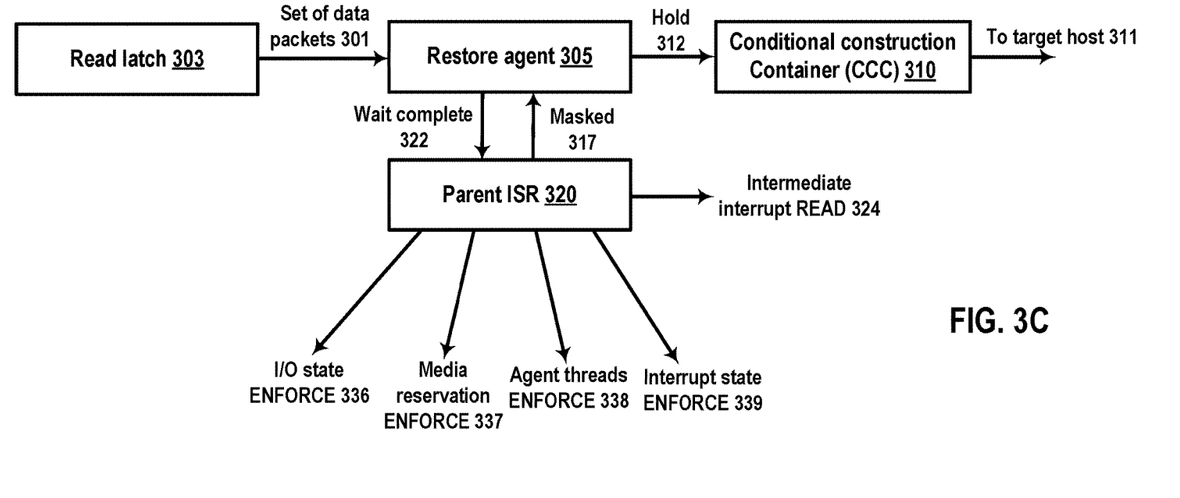

With reference to FIG. 3C, after the abort event condition is remedied, the restore process can begin to resume from the point at which the unexpected abort event occurred. The parent ISR 315 can query the intermediate child ISR to fetch (READ 324) details of all the child ISRs (e.g. 331-334) that have to be spawned for re-enforcement of all of the states of the previous restore session, saved when the unexpected above event was received. Each child ISR is re-entrant in nature, meaning that if another unexpected abort event is received while the state re-enforcement is in progress, the intermediate child ISR would notify the parent ISR 315 about the received abort event, and could retry resumption of the restore session after some time, until the parent ISR 315 masked condition is unmasked and completed. Once all of the child ISRs have successfully re-enforced the previous state of the restore session (e.g. 336-339), the parent ISR 315 can remain in the masked state 317, indicating that the restore agent 305 can wait 322 for completion of the child ISR (e.g 341-344) restore processes.

Figure 3D:
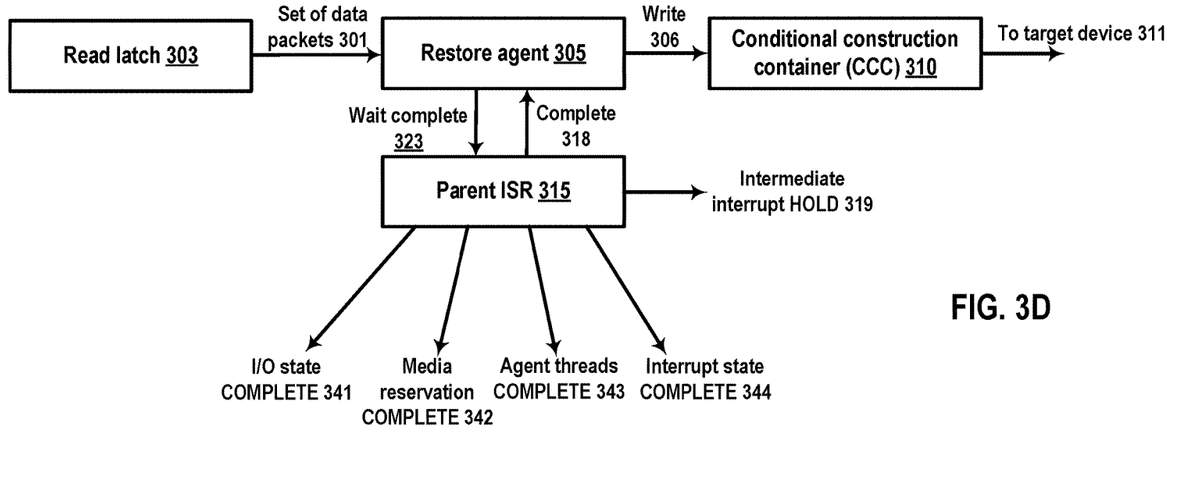

With reference to FIG. 3D, with the state of the interrupted restore session restored by the child ISRs, restore agent 305 can resume receiving data packets 305, writing 306 data packets to CCC 310, and CCC 310 can write the packets 305 to target device 311. When all child ISRs (e.g. 341-344) indicate that their processes are complete, then the restore has completed. Parent ISR 315 can notify restore agent 305 that restore is complete. The intermediate child ISR can be held 319.

Figure 4:
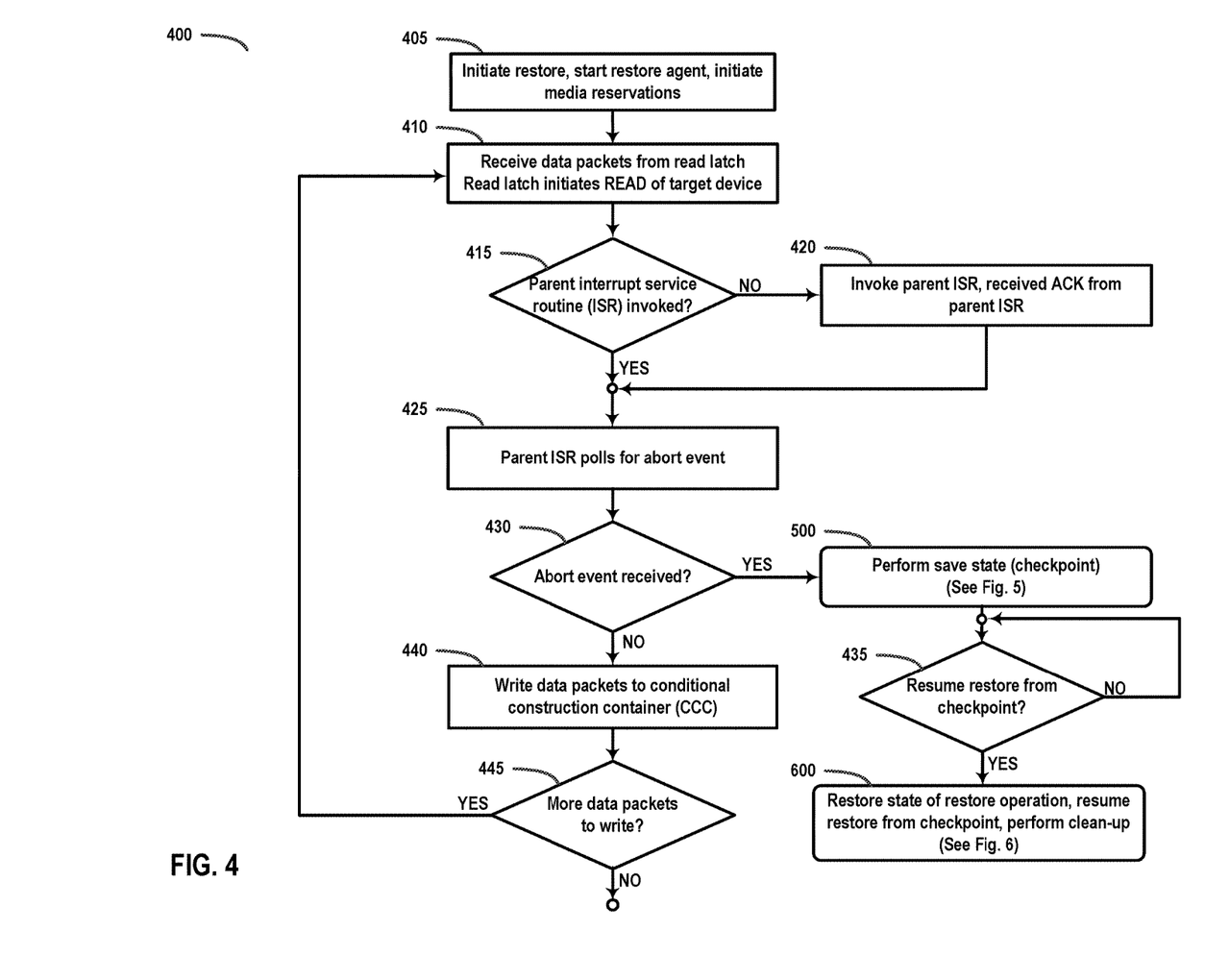
FIG. 4 illustrates, in block diagram form, a method of performing an uninterrupted restore in view of a one or more unexpected abort events in a storage system, in accordance with some embodiments.

FIG. 4 illustrates, in block diagram form, a method 400 of performing an uninterrupted restore in view of a one or more unexpected abort events in a storage system, in accordance with some embodiments.

In operation 405, an restore agent 305 (e.g. VM backup/restore 210X) receives a request to perform a restore of application data of a VM 210 in accordance with a restore policy 310. Restore agent 305 can initiate processes that start a data stream of packets 301 from a host or client 200, including requesting one or more media reservations and requesting an initial set of data packets 301 for transfer to a target storage, e.g. secondary storage 250.

In operation 410, restore agent 305 can receive the data packets 301 from the source media to be restored.

In operation 415, it can be determined whether the parent interrupt service routine (ISR) 315 has been previously invoked. A bit in the interrupt state of the parent ISR 315 can be examined to determine whether the parent ISR has been previously invoked. In an embodiment, when the parent ISR 315 is invoked, the parent ISR 315 can send a message to the restore agent 305 that the parent ISR has been invoked, and the restore agent 305 can maintain one or more state flags relating to the parent ISR 315. If parent ISR 315 has not been previously invoked, then in operation 420, parent ISR 315 is invoked. In an embodiment, restore agent 305 may receive an acknowledgement (ACK) 316 from parent ISR 315 that the parent ISR has been invoked. Method 400 resumes at operation 425.

In operation 425, parent ISR 315 can poll for detection of an unexpected abort event. In an embodiment, kernel 230 can maintain a variable with one or more flags indicating one or more types of abort events, e.g. power outage, disk head failure, disk media failure, vibration meter that detects an earthquake, and the like.

In operation 430, it can be determined whether an unexpected abort event has been detected. Parent ISR 315 can periodically poll the kernel 230 flag(s) to determine whether an unexpected abort event has occurred. If so, then method 400 continues at operation 500, otherwise method 400 continues at operation 440.

In operation 500, in response to an unexpected abort event being detected, the current state of the restore can be saved. Operation 500 is described in detail, below, with reference to FIG. 5. Method 400 continues at operation 435.

In operation 435, it can be determined whether to resume the restore from the checkpoint. The determination can be made in a variety of configurable ways. In an embodiment, the restore can be resumed in response to an administrator command, such as by remote administration 110 of FIG. 1. In an embodiment, the restore session can remain in its saved state until a next restore window that is specified in a service level agreement (SLA) associated with the customer whose data was being restored when the unexpected abort was detected. In a configurable embodiment, restore resumption logic can be programmed to monitor a status of "no unexpected abort events detected," such as by monitoring one or more state flags of the operating system, such as in the kernel 230. Restore resumption logic can be programmed to wait an configurable additional period of time after detecting that there are no unexpected abort events detected. In an embodiment, the additional period of time can be configured based upon the type of unexpected abort event that caused the restore session to be interrupted. For example, a restore session might be resumed 2 hours after detecting that a power outage had been corrected. Once a command, or configurable logic condition, indicates that the restore session may be resumed, then method 400 continues at operation 600.

In operation 600, the state of the restore session, prior to being interrupted by the unexpected abort event, is restored and the restore can resume from the point of interruption. Operation 600 is described in detail, below, with reference to FIG. 6.

In operation 440, no unexpected abort event was detected in operation 430, and restore agent 305 can write a set of data packets 301 to CCC 310. CCC 310 can write these data packets to the target device, e.g. secondary storage 250.

In operation 445, it can be determined whether there are more data packets to write from the media source to the target storage. If not, then method 400 ends, otherwise method 400 continues at operation 410.

Figure 5:
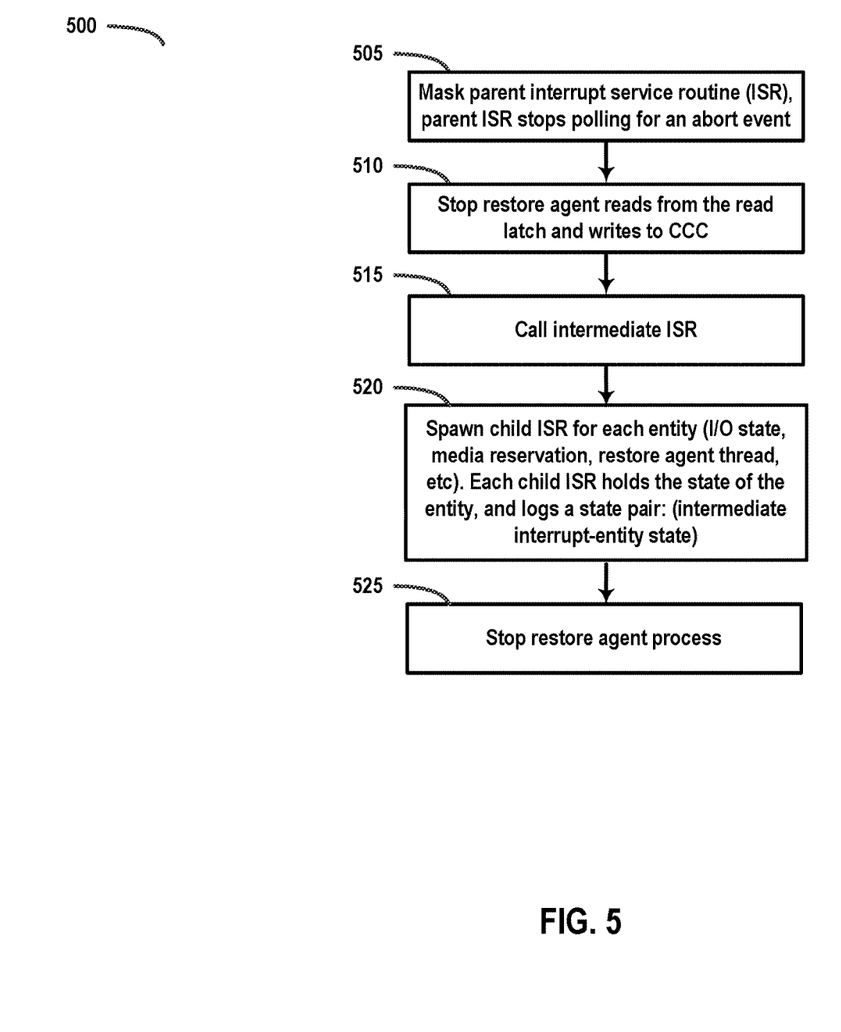
FIG. 5 illustrates, in block diagram form, a method of saving a state of a restore session that has received an unexpected abort event in a storage system, in accordance with some embodiments.

FIG. 5 illustrates, in block diagram form, a method 500 of saving a state of a restore that has received an unexpected abort event in a storage system, in accordance with some embodiments.

In operation 505, in response to receiving an unexpected abort event, parent ISR 315 can be masked. In the masked state, parent ISR 315 stops polling for an unexpected abort event.

In operation 510, the restore agent 305 stops requesting data packets from the data source and stops writing data packets to the CCC 310.

In operation 515, parent ISR 315 calls an intermediate child ISR that will manage the saving of state of the restore session so that the restore session may later be resumed.

In operation 520, the intermediate child ISR spawns a re-entrant child ISR for each and every I/O state, media reservation event, daemon and restore agent thread, and every interrupt used in the restore session. Each child ISR holds/masks the state of the entity that it manages. Intermediate child ISR logs the child ISR, the entity managed by the child ISR, the state of the entity managed by the child ISR, and the intermediate child ISR that spawned the child ISRs, to preserve the restore session state.

In operation 525, the restore agent 305 is stopped.

Figure 6:
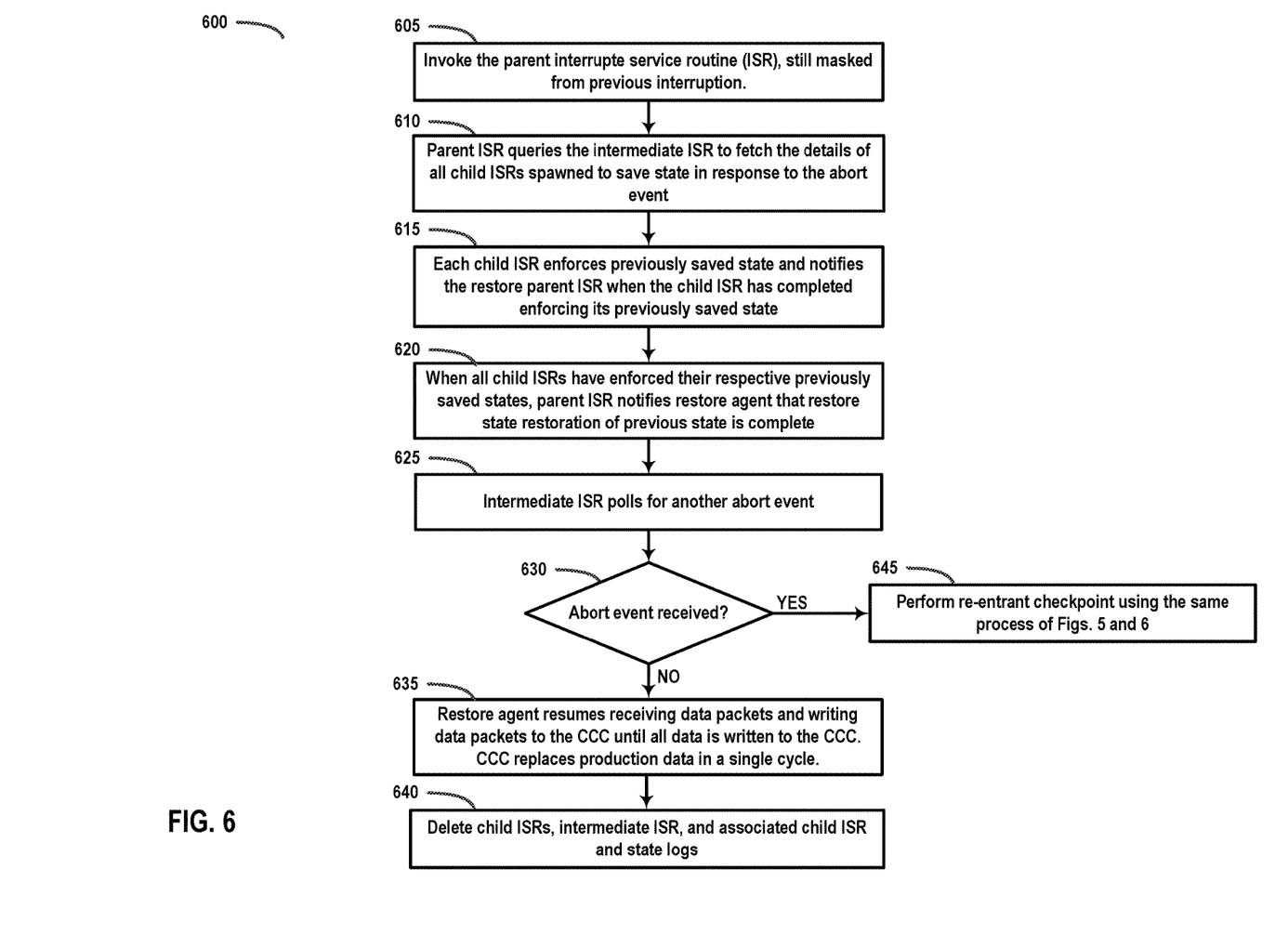
FIG. 6 illustrates, in block diagram form, a method of restoring a saved state of a restore session that was interrupted by one or more unexpected abort events, in accordance with some embodiments.

FIG. 6 illustrates, in block diagram form, a method 600 of restoring a saved state of a restore that was interrupted by one or more unexpected abort events, in accordance with some embodiments.

In operation 605, the restore agent 305 can invoke the parent ISR 315 which is in the masked state from the previously received unexpected abort event.

In operation 610, the parent ISR 315 can query the intermediate child ISR to fetch the details of all child ISRs spawned to save the state of the restore session in response to receiving the unexpected abort event.

In operation 615, each child ISR can enforce the saved state of the entity (I/O, media reservation, agent thread, daemon, interrupt, etc) to the state the entity was at the time of receipt of the unexpected abort event.

In operation 620, when all child ISRs have enforced their respective previously saved states, the parent ISR 315 notifies the restore agent 305 that the restore session state restoration is complete.

In operation 625, the intermediate child ISR begins periodically polling for another unexpected abort event.

In operation 630, in response to the intermediate child ISR receiving another unexpected abort event, method 600 resumes at operation 635, otherwise method 600 continues at operation 640.

In operation 635, the operations to perform save the state in response to an unexpected abort event can be performed using re-entrant interrupt service routines (ISRs) as described above in FIGS. 5 and 6.

In operation 640, another unexpected above event has not been received, and the restore agent 305 resumes receiving data packets 301 and writing the data packets to CCC 310 until all data is written to the CCC 310. In a single operational cycle (e.g. processor window, or slice), CCC 310 can replace the production data with the restored data in CCC 310.

In operation 645, intermediate child ISR deletes the child ISRs that saved state for the now-completed restore session. The state logs associating the intermediate child ISR and the child ISRs and their respective state entities can also be deleted. The intermediate child ISR can be put into a hold state. Method 600 ends.

Figure 7:
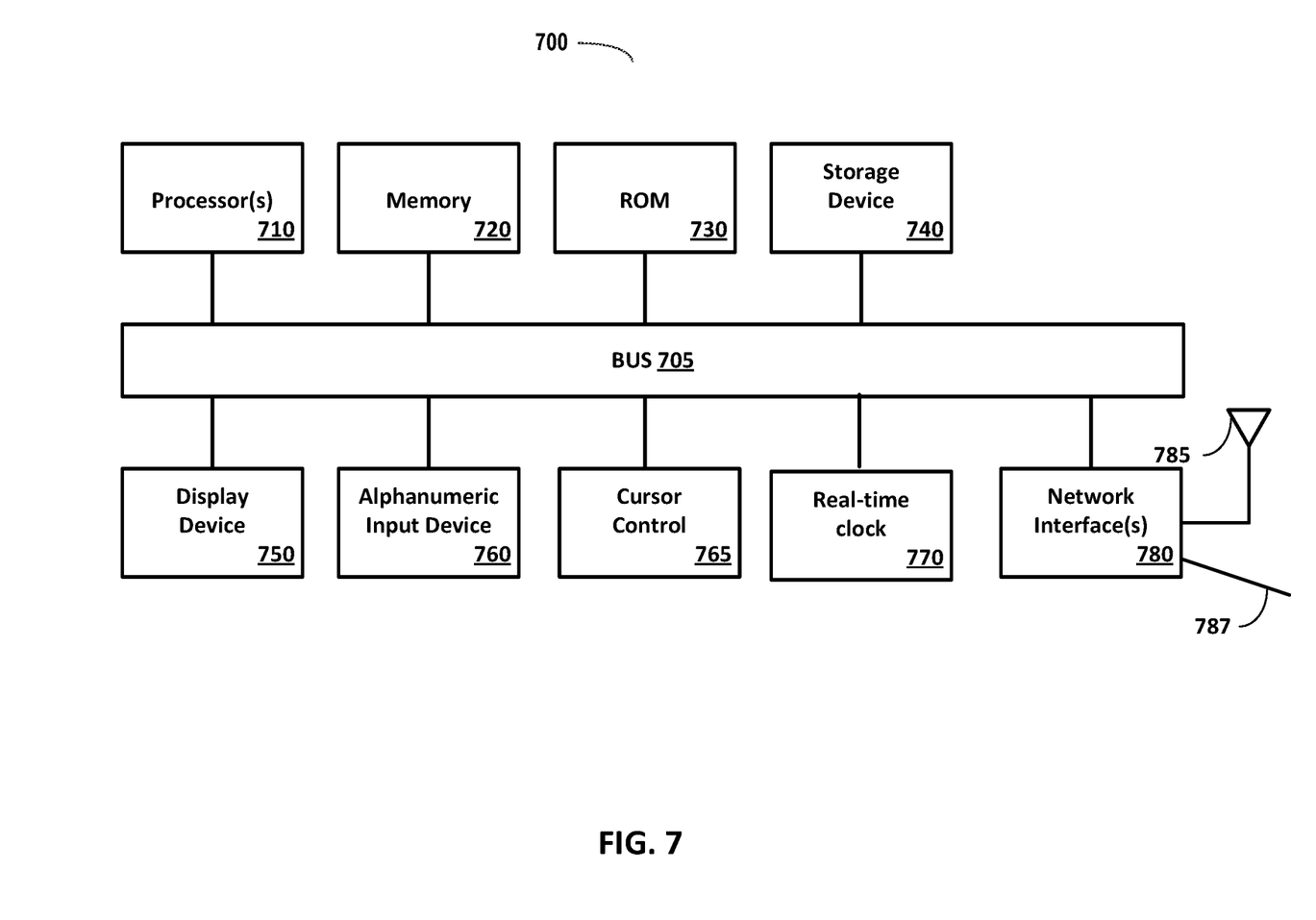
FIG. 7 illustrates, in block diagram form, a representative computing system upon which the enclosed functionality can be implemented.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700. Any, or all, of memory 720, ROM 730, or data storage device 740 can be programmed with executable instructions that, when executed by processor(s) 710 perform the functionality described herein, including by not limited to, a virtual machine, a host, hypervisor, VM backup/restore proxy 210, parent ISR 221, child ISRs 222, discover API 227, application agent 212, backup application 305, de-duplication engine 255, and other claimed functionality.

Computing system 700 may also be coupled via bus 705 to display device 750, such as a light-emitting diode display (LED), or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of performing uninterrupted restores in view of one or more unexpected abort events, the method comprising:

in response to a restore agent receiving one or more data packets to be restored from a backup data storage to a target storage, invoking a parent interrupted service routine (ISR) that polls for an unexpected abort event;

writing the received data packets to a conditional construction container (CCC) communicatively coupled to the target storage;
in response to receiving the unexpected abort event, saving a state of a plurality of restore processes; and
restoring the saved state at a future time, and completing the restore of data from the backup data storage to the target storage.

2. The method of claim 1, further comprising:
masking the parent ISR; and
stopping the writes of received data packets to the CCC.

3. The method of claim 1, wherein saving state of the plurality of restore processes comprises:
generating a re-entrant child ISR for each restore process in the plurality of restore processes; and
calling each child ISR to hold a current state of the restore process associated with the child ISR.

4. The method of claim 3, further comprising:
calling an intermediate ISR that, for each child ISR, logs the current state of the restore process in the plurality of restore processes, in association with the intermediate ISR.

5. The method of claim 4, further comprising:
querying the intermediate ISR to fetch details of current states of the plurality of restore processes;
calling each child ISR to enforce the fetched current state of a restore process in the plurality of restore processes associated with the child ISR.

6. The method of claim 5, further comprising:
notifying the restore agent that the child ISRs have each enforced the current state of the restore process associated with the child ISRs; and
instructing the restore agent to resume receiving data packets and writing data packets to the CCC.

7. The method of claim 4, further comprising:
receiving a second unexpected abort event; and
calling each re-entrant child ISR a second time to save a state for each restore process of a second plurality of restore processes.

8. A non-transitory computer-readable medium programmed with executable instructions that, when executed by a processing system having at least one hardware processor, perform operations of performing an uninterrupted restore in view of one or more unexpected abort events, the operations comprising:
in response to a restore agent receiving one or more data packets to be restored from a backup data storage to a target storage, invoking a parent interrupted service routine (ISR) that polls for an unexpected abort event;
writing the received data packets to a conditional construction container (CCC) communicatively coupled to the target storage;
in response to receiving the unexpected abort event, saving a state of a plurality of restore processes; and
restoring the saved state at a future time, and completing the restore of data from the backup data storage to the target storage.

9. The medium of claim 8, the operations further comprising:
masking the parent ISR; and
stopping the writes of received data packets to the CCC.

10. The medium of claim 8, wherein saving state of the plurality of restore processes comprises:
generating a re-entrant child ISR for each restore process in the plurality of restore processes; and
calling each child ISR to hold a current state of the restore process associated with the child ISR.

11. The medium of claim 10, the operations further comprising:
calling an intermediate ISR that, for each child ISR, logs the current state of the restore process in the plurality of restore processes, in association with the intermediate ISR.

12. The medium of claim 11, the operations further comprising:
querying the intermediate ISR to fetch details of current states of the plurality of restore processes;
calling each child ISR to enforce the fetched current state of a restore process in the plurality of restore processes associated with the child ISR.

13. The medium of claim 12, the operations further comprising:
notifying the restore agent that the child ISRs have each enforced the current state of the restore process associated with the child ISRs; and
instructing the restore agent to resume receiving data packets and writing data packets to the CCC.

14. The medium of claim 11, the operations further comprising:
receiving a second unexpected abort event; and
calling each re-entrant child ISR a second time to save a state for each restore process of a second plurality of restore processes.

15. A system comprising:
a processing system having at least one hardware processor, the processing system coupled to a memory programmed with executable instructions that, when executed by the processing system, perform operations of performing an uninterrupted restore operation, the operations comprising:
in response to a restore agent receiving one or more data packets to be restored from a backup data storage to a target storage, invoking a parent interrupted service routine (ISR) that polls for an unexpected abort event;
writing the received data packets to a conditional construction container (CCC) communicatively coupled to the target storage;
in response to receiving the unexpected abort event, saving a state of a plurality of restore processes; and
restoring the saved state at a future time, and completing the restore of data from the backup data storage to the target storage.

16. The system of claim 15, the operations further comprising:
masking the parent ISR; and
stopping the writes of received data packets to the CCC.

17. The system of claim 15, wherein saving state of the plurality of restore processes comprises:
generating a re-entrant child ISR for each restore process in the plurality of restore processes; and
calling each child ISR to hold a current state of the restore process associated with the child ISR.

18. The system of claim 17, the operations further comprising:
calling an intermediate ISR that, for each child ISR, logs the current state of the restore process in the plurality of restore processes, in association with the intermediate ISR.

19. The system of claim 18, the operations further comprising:
querying the intermediate ISR to fetch details of current states of the plurality of restore processes;

calling each child ISR to enforce the fetched current state of a restore process in the plurality of restore processes associated with the child ISR.

20. The system of claim 19, the operations further comprising:
    notifying the restore agent that the child ISRs have each enforced the current state of the restore process associated with the child ISRs; and
    instructing the restore agent to resume receiving data packets and writing data packets to the CCC.

21. The system of claim 18, further comprising:
    receiving a second unexpected abort event; and
calling each re-entrant child ISR a second time to save a state for each restore process of a second plurality of restore processes.

* * * * *